United States Patent
Wang et al.

(10) Patent No.: US 6,762,262 B1
(45) Date of Patent: Jul. 13, 2004

(54) PREPARATION OF ACRYLIC POLYOLS

(75) Inventors: Wei Wang, Boothwyn, PA (US); Stephen H. Harris, Kennett Square, PA (US)

(73) Assignee: Arco Chemical Technology, L.P., Greenville, DE (US)

(*) Notice: Subject to any disclaimer, the term of this patent is extended or adjusted under 35 U.S.C. 154(b) by 0 days.

(21) Appl. No.: 10/668,845

(22) Filed: Sep. 23, 2003

(51) Int. Cl.$^7$ .................................................. C08F 2/06
(52) U.S. Cl. ........................ 526/210; 526/227; 526/319
(58) Field of Search ................................ 526/210, 227, 526/319

(56) References Cited

U.S. PATENT DOCUMENTS

| | | | |
|---|---|---|---|
| 5,475,073 A | * 12/1995 | Guo | 526/333 |
| 5,480,943 A | 1/1996 | Guo | 525/330.5 |
| 5,525,693 A | 6/1996 | Guo | 526/329.2 |
| 5,534,598 A | 7/1996 | Guo | 525/329.2 |
| 5,646,213 A | 7/1997 | Guo | 524/562 |
| 6,294,607 B1 | 9/2001 | Guo et al. | 524/507 |

* cited by examiner

Primary Examiner—William Cheung
(74) Attorney, Agent, or Firm—Shao-Hua Guo

(57) ABSTRACT

A method for making a low-yellowing acrylic polyol is disclosed. The acrylic polyol has an APHA color increase less than 100% when it is mixed with 1.5 wt % of an UV light stabilizer. The method comprises free radically copolymerizing an allylic alcohol, an alkyl acrylate or methacrylate, and optionally a vinyl comonomer selected from the group consisting of vinyl aromatic, vinyl ethers, and vinyl esters in an initiator concentration less than or equal to 0.8 wt % of the total amount of monomers.

15 Claims, No Drawings

PREPARATION OF ACRYLIC POLYOLS

FIELD OF THE INVENTION

The invention relates to a method for preparing acrylic polyols. More particularly, the invention relates to a method for preparing an acrylic polyol that causes low color increase when mixed with UV light stabilizers.

BACKGROUND OF THE INVENTION

High-solids acrylic polyols are of low molecular weights. Typically, high-solids acrylic polyols have a number average molecular weight (Mn) from 1,000 to 5,000. Many problems are associated with the molecular weight reduction of acrylic polyols.

First, the molecular weight reduction is often compensated by an increase in hydroxyl number. Typically, high-solids acrylic polyols have a hydroxyl number in the range of 60 mg KOH/g to 160 mg KOH/g. The lower the molecular weight, the higher the hydroxyl number is needed. The increased hydroxyl number requires an increase in the amount of crosslinking agents in the subsequent coating formulations. Crosslinking agents such as isocyanates are expensive, and thus the coating cost is increased.

Second, low molecular weight resins have reduced weatherability because the increased concentration of the polymer chain ends. The polymer chain ends are often the starting points for photodegradation. Thus, the coatings formulated from high-solids acrylic polyols require an increase in the amount of ultraviolet (UV) light stabilizers. The latter are very expensive.

Finally, making low molecular weight acrylic polyols requires a large amount of free radical initiator. Typically, 2 wt % to 10 wt % of initiator based on the amount of monomers is used for making high-solids acrylic polyols. The initiators are expensive.

Furthermore, we have found that the acrylic polyols made with high initiator concentrations cause significant color increase when mixed with UV light stabilizers. In summary, new methods are needed for preparing high-solids acrylic polyols. Ideally, the method would use a low initiator concentration and produce acrylic polyols having low color increase when mixed with UV light stabilizers.

SUMMARY OF THE INVENTION

The invention is a method for preparing low-yellowing acrylic polyols. The method comprises free radically copolymerizing an allylic alcohol, an alkyl acrylate or methacrylate, and optionally a vinyl comonomer selected from the group consisting of vinyl aromatics, vinyl ethers, and vinyl esters. The polymerization is performed at an initiator concentration less than or equal to 0.8 wt % of the total amount of monomers. Surprisingly, the resulting acrylic polyol made at such a low initiator concentration remains at very low molecular weights and is suitable for high-solids coating applications.

More importantly, we found that an acrylic polyol made with a higher initiator concentration gives a significant color increase (greater than 100%) when the acrylic polyol is mixed with UV light stabilizers. In contrast, the resulting acrylic polyol of the invention has significantly lower color increase when mixed with UV light stabilizers.

DETAILED DESCRIPTION OF THE INVENTION

The invention is a method for preparing low-yellowing acrylic polyols. By "low yellowing," we mean that the acrylic polyol, when mixed with a UV light stabilizer, gives a lower APHA color increase than the acrylic polyol known in the prior art.

The method comprises free radically copolymerizing an allylic alcohol, an alkyl acrylate or methacrylate, and optionally a vinyl comonomer selected from the group consisting of vinyl aromatics, vinyl ethers, and vinyl esters at an initiator concentration less than or equal to 0.8 wt % of the total amount of comonomers.

Suitable allylic alcohols include those which have the general structure:

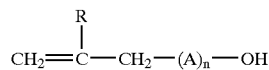

R is hydrogen, a $C_1$–$C_{10}$ alkyl, or a $C_6$–$C_{12}$ aryl group; A is an oxyalkylene group; and n represents an average number of oxyalkylene groups. Preferably, n is from about 0 to about 5. More preferably, n is from about 1 to about 2. Most preferably, n is about 1. Preferred allylic alcohols include allyl alcohol, methallyl alcohol, allyl alcohol propoxylates, and allyl alcohol ethoxylates. Allyl alcohol monopropoxylate is particularly preferred.

Suitable alkyl acrylates and methacrylates include $C_1$–$C_{20}$ alkyl acrylates and methacrylates. Examples are n-butyl acrylate, n-butyl methacrylate, lauryl acrylate, lauryl methacrylate, tridecyl acrylate, tridecyl methacrylate, 2-ethylhexyl acrylate, 2-ethylhexyl methacrylate, methyl methacrylate, t-butyl methacrylate, iso-butyl methacrylate, benzyl methacrylate, cyclohexyl methacrylate, tetrahydrofuryl methacrylate, and iso-bornyl methacrylate, and the like, and mixtures thereof. Low $T_g$ acrylates or methacrylates, such as n-butyl acrylate and 2-ethylhexyl acrylate, are preferred.

Preferably, the allylic alcohol to be used is charged into a reactor and the acrylate or methacrylate is partly or wholly charged gradually into the reactor during the polymerization. This is because the allylic monomer is much less reactive than the acrylate or methacrylate and therefore the gradual addition of the acrylate or methacrylate can ensure an efficient and even incorporation of the allylic monomer into the polymer.

Examples of suitable optional vinyl aromatics, vinyl ethers and vinyl esters include styrene, α-methyl styrene, vinyl methyl ether, and vinyl acetate. Incorporation of the optional monomers may reduce raw material cost or modify the polyol properties. For example, incorporating styrene into the acrylic polyol reduces the cost because styrene is less expensive.

Unlike the known acrylic polyols, the acrylic polyol prepared by the method of the invention gives low color increase when it is mixed with an ultraviolet (UV) light stabilizer. UV light stabilizers are commonly used in coating formulations to prevent the coatings from photodegradation. However, we found that when a known acrylic polyol is mixed with UV light stabilizers, the mixture noticeably increases in color. See Comparative Examples 3–5 where the APHA color increases are greater than 100%. In contrast, the acrylic polyols made according to the invention have an APHA color increase less than 100% when mixed with 1.5 wt % of UV light stabilizers. Preferably, the APHA color increase is less than 50%.

The APHA color is measured according to ASTM D5386-93b. The acrylic polyol is dissolved in butyl acetate to give a solution of 80 wt % solids. To the solution is added 1.5 wt % of an UV light stabilizer based on the amount of the acrylic polyol. After mixing, the initial APHA color, $A_0$, is determined. The solution is then placed into a steel; unlined can which is put into an oven maintaining at 50° C. for 7 days. The final APHA color, A, is then determined. The APHA color increase, $\Delta$, is calculated by $$\Delta = (A - A_0)/A_0$$

Examples of UV light stabilizers include UV absorbers (UVAs) such as benzotriazole compounds (e.g., Ciba-Geigy's Tinuvin 328 and Tunivin 900) and hindered amine light stabilizers (HALS) such as Ciba-Geigy's Tinuvins 123 and 292.

Suitable initiators include those known in the polymer industry. High temperature initiators are preferred because the polymerization is preferably performed at high temperatures. Preferably, the free radical initiators are selected from the group consisting of alkyl peroxides, hydroperoxides, peresters, and azo compounds. Examples are t-butyl peroxide, cumyl peroxide, t-butyl hydroperoxide, cumyl hydroperoxide, and t-butyl perbenzoate.

Preferably, the initiator is partly or wholly charged into the reactor gradually during polymerization. Gradual addition of the initiator can increase the monomer conversion.

Contrary to the general belief in the art that a low molecular resin can only be made at a high initiator concentration, we found that the low molecular weight acrylic polyols can be made at a very low initiator concentration. Preferably, the acrylic polyol made according to the invention has a number average molecular weight (Mn) within the range of about 500 to about 10,000. More preferably, the Mn is within the range of about 500 to about 5,000. Most preferably, the Mn is within the range of about 500 to about 3,000. Preferably, the acrylic polyol has a polydispersity (the ratio of the weight average molecular weight over the number average molecular weight) within the range of about 1.5 to about 3.5. More preferably, the polydispersity is within the range of about 1.5 to about 2.5.

Preferably, the acrylic polyol made according to the invention has a hydroxyl number within the range of about 20 mg KOH/g to about 500 mg KOH/g. More preferably, the hydroxyl number is within the range of about 50 mg KOH/g to about 250 mg KOH/g. Most preferably, the hydroxyl number is within the range of about 75 mg KOH/g to about 160 mg KOH/g.

Preferably, the acrylic polyol made according to the invention has a glass transition temperature ($T_g$) within the range of about −50° C. to 150° C. More preferably, the $T_g$ is within the range of about −50° C. to 50° C. Low $T_g$ acrylic polyols such as copolymers of allyl alcohol monopropoxylate and n-butyl acrylate have found many special applications in coatings because they are liquid at room temperature.

The polymerization is preferably performed in the presence of a solvent. Suitable solvents include alcohols, ethers, esters, ketones, glycol ethers, glycol ether esters, and aliphatic and aromatic hydrocarbons. Examples are n-butanol, isopropanol, xylene, n-butyl acetate, methyl amyl ketone (MAK), propylene glycol methyl ether, and propylene glycol methyl ether acetate (PMAc). Preferably, the amount of solvent used is less than 50 wt % of the total reactor charge. More preferably, the amount of solvent is less than 30 wt % of the total reactor charge. Most preferably, the amount of solvent is less than 10 wt % of the total reactor charge.

The following examples merely illustrate the invention. Those skilled in the art will recognize many variations that are within the spirit of the invention and scope of the claims.

EXAMPLE 1

Preparation of Acrylic Polyol with 0.41 WT % of T-butyl Hydroperoxide (TBHP)

A 1-liter stainless steel reactor equipped with an agitator, steam heating jacket, temperature controller, nitrogen/air purge device, addition pump, and vacuum distillation device is charged with allyl alcohol monopropoxylate (130 grams). n-Butyl acrylate (454.6 grams) and TBHP (3.4 grams, T-hydro 70, 70% aqueous solution, product of Lyondell Chemical Company) are mixed and charged into the addition pump. The reactor is purged three times with nitrogen and then sealed. The reactor contents are heated to 155° C. The mixture of n-butyl acrylate and T-hydro 70 are added into reactor gradually at a decreasing rate over a 6 hour period while maintaining the reaction temperature at 155° C. Stirring at 155° C. is continued for 30 minutes after the addition is completed. Unreacted monomers are removed by vacuum distillation (maximum temperature: 155° C.). A liquid acrylic polyol (561.4grams) is collected. It has composition: 19.1 wt % of allyl alcohol monopropoxylate monomeric units and 80.9 wt % of n-butyl acrylate monomeric units; number average molecular weight (Mn): 3400; weight average molecular weight (Mw): 10200; polydispersity: 3.0; hydroxyl number: 92.3 mg KOH/g; Brookfield viscosity at 25° C.: 53700 cps; and $T_g$: −41° C.

The acrylic polyol is dissolved in butyl acetate to give a solution of 80 wt % solids. To the solution is added 1.5 wt % each of Tinuvin 123 and Tinuvin 328, based on the total amount of the acrylic polyol. The initial APHA color, $A_0$, is 20. The solution is then placed into a steel, unlined can which is put into an oven maintaining at 50° C. for 7 days. The final APHA color, A, is 39. The APHA color increase, A, which is calculated by $\Delta = (A-A_0)/A_0$, is 95%.

EXAMPLE 2

Preparation of Acrylic Polyol with 0.41 WT % of TBHP and Isopropanol as Solvent

The procedure of Example 1 is repeated but isopropanol (38 grams) is charged into the reactor together with allyl alcohol monopropoxylate. A liquid acrylic polyol (563.1 grams) is collected. It has composition: 18.7 wt % of allyl alcohol monopropoxylate monomeric units and 81.3 wt % of n-butyl acrylate monomeric units; number average molecular weight (Mn): 2700; weight average molecular weight (Mw): 6450; polydispersity (Mw/Mn): 2.39; hydroxyl number: 90.4 mg KOH/g; and Brookfield viscosity at 25° C.: 30500 cps; and $T_g$: −41° C.

The color increase $\Delta$, measured according to the method described in Example 1, is 43%.

COMPARATIVE EXAMPLE 3

Preparation of Acrylic Polyol with 0.81 WT % of TBHP

The procedure of Example 1 is repeated but 6.8 grams of T-hydro 70 is used. A liquid polyol (560.2 grams) is collected. It has composition: 18.4 wt % of allyl alcohol monopropoxylate monomeric units and 81.6 wt % of n-butyl acrylate monomeric units; number average molecular weight (Mn): 3240; weight average molecular weight (Mw): 9990; polydispersity: 3.08; hydroxyl number: 89.1 mg KOH/g; Brookfield viscosity at 25° C.: 50460 cps; and $T_g$: −41° C.

The color increase $\Delta$, measured according to the method described in Example 1, is 197%.

COMPARATIVE EXAMPLE 4

Preparation of Acrylic Polyol with 1.6 WT % of TBHP

The procedure of Example 1 is repeated but 13.6 grams of T-hydro 70 is used. A liquid acrylic polyol (560.2 grams) is collected. It has composition: 18.2 wt % of allyl alcohol monopropoxylate monomeric units and 81.8 wt % of n-butyl acrylate monomeric units; number average molecular weight (Mn): 3010; weight average molecular weight (Mw): 9420; polydispersity: 3.13; hydroxyl number: 88 mg KOH/g; Brookfield viscosity at 25° C.: 43290 cps; and $T_g$: −41° C.

The color increase Δ, measured according to the method described in Example 1, is 228%.

COMPARATIVE EXAMPLE 5

Preparation of Acrylic Polyol with 6.1 WT % of TBHP

The procedure of Example 1 is repeated but 13.6 grams of T-hydro 70 is used. A liquid polyol (560.2 grams) is collected. It has composition: 16.3 wt % allyl alcohol monopropoxylate monomeric units and 83.7 wt % of n-butyl acrylate monomeric units; number average molecular weight (Mn): 2380; weight average molecular weight (Mw): 7080; polydispersity: 2.98; hydroxyl number: 79 mg KOH/g; Brookfield viscosity at 25° C.: 28360 cps; and $T_g$: −42° C.

The color increase Δ, measured according to the method described in Example 1, is 317%.

EXAMPLE 6

Preparation of Acrylic Polyol with 0.48 WT % of TBHP

The reactor as described in Example 1 is charged with allyl alcohol monoproxylate (184 grams). n-Butyl acrylate (394 grams) and T-hydro 70 (4.0 grams) are mixed and charged into addition pump. The reactor is purged three times with nitrogen and then sealed. The reactor contents are heated to 155° C. The mixture of n-butyl acrylate and T-hydro 70 are added into reactor gradually at a decreasing rate over a 6 hour period while maintaining the reaction temperature at 155° C. Stirring at 155° C. is continued for 30 minutes after the addition is completed. Unreacted monomers are removed by vacuum distillation (maximum temperature: 155° C.). A liquid acrylic polyol (539.9 grams) is collected. It has composition: 26.8 wt % of allyl alcohol monopropoxylate monomeric units and 73.2 wt % of n-butyl acrylate monomeric units; number average molecular weight (Mn): 2650; weight average molecular weight (Mw): 6210; polydispersity: 2.34; hydroxyl number 130 mg KOH/g; Brookfield viscosity at 25° C.: 45770 cps; and $T_g$: −35° C.

The color increase Δ, measured according to the method described in Example 1, is 33%.

EXAMPLE 7

Preparation of Acrylic Polyol with 0.43 WT % of TBHP and Isopropanol

The reactor as described in Example 1 is charged with allyl alcohol monoproxylate (170 grams) and isopropanol (36 grams). n-Butyl acrylate (395 grams) and T-hydro 70 (3.5 grams) are mixed and charged into addition pump. The reactor is purged three times with nitrogen and then sealed. The reactor contents are heated to 155° C. The mixture of n-butyl acrylate and T-hydro 70 are added into reactor gradually at a decreasing rate over a 6 hour period while maintaining the reaction temperature at 155° C. Stirring at 155° C. is continued for 30 minutes after the addition is completed. 25 Unreacted monomers are removed by vacuum distillation (maximum temperature: 155° C.). A liquid acrylic polyol (524.8 grams) is collected. It has composition: 24.8 wt % of allyl alcohol monopropoxylate monomeric units and 75.2 wt % of n-butyl acrylate monomeric units; number average molecular weight (Mn): 2500; weight average molecular weight (Mw): 5580; polydispersity: 2.21; hydroxyl number: 120 mg KOH/g; Brookfield viscosity at 25° C.: 32300 cps; and $T_g$: −37° C.

The color increase Δ, measured according to the method described in Example 1, is 50%.

COMPARATIVE EXAMPLE 8

Preparation of Acrylic Polyol with 6.5 WT % of TBHP

The reactor as described in Example 1 is charged with allyl alcohol monoproxylate (175 grams). n-Butyl acrylate (365 grams) and T-hydro 70 (50 grams) are mixed and charged into addition pump. The reactor is purged three times with nitrogen and then sealed. The reactor contents are heated to 155° C. The mixture of n-butyl acrylate and T-hydro 70 are added into reactor gradually at a decreasing rate over a 6 hour period while maintaining the reaction temperature at 155° C. Stirring at 155° C. is continued for 30 minutes after the addition is completed. Unreacted monomers are removed by vacuum distillation (maximum temperature: 155° C.). A liquid acrylic polyol (525.1 grams) is collected. It has composition: 26.8 wt % of allyl alcohol monopropoxylate monomeric units and 73.2 wt % of n-butyl acrylate monomeric units; number average molecular weight (Mn): 2440; weight average molecular weight (Mw): 6050; polydispersity: 2.48; hydroxyl number: 120 mg KOH/g; Brookfield viscosity at 25° C.: 45770 cps; and $T_g$: −40° C.

The color increase Δ, measured according to the method described in Example 1, is 131%.

TABLE 1

APHA COLOR TEST RESULTS

| Ex. No. | Initiator Concentration | Solvent | $A_o$ | A | Δ |
| --- | --- | --- | --- | --- | --- |
| 1 | 0.41% | No | 20 | 39 | 95% |
| 2 | 0.41% | Isopropanol | 42 | 60 | 43% |
| C3 | 0.81% | No | 30 | 89 | 197% |
| C4 | 1.60% | No | 29 | 95 | 228% |
| C5 | 6.10% | No | 30 | 125 | 317% |
| 6 | 0.48% | No | 40 | 60 | 50% |
| 7 | 0.43% | Isopropanol | 45 | 60 | 33% |
| C8 | 6.50% | No | 54 | 125 | 131% |

We claim:

1. A method for preparing a low-yellowing acrylic polyol, said method comprising free radically copolymerizing an allylic alcohol, an alkyl acrylate or methacrylate, and optionally a vinyl comonomer selected from the group consisting of vinyl aromatics, vinyl ethers, and vinyl esters in an initiator concentration less than or equal to 0.8 wt % of the total amount of monomers, in a solvent selected from the group consisting of alcohols, ethers, esters, ketones, glycol ethers, glycol ether esters, aliphatic and aromatic hydrocarbons, and mixture thereof, wherein the resulting acrylic polyol has an APHA color increase less than 100% when mixed with 1.5 wt %, based on the amount of the acrylic polyol, of an UV light stabilizer.

2. The method of claim 1, wherein the initiator concentration is less than or equal to 0.5 wt % of the total amount of monomers.

3. The method of claim 1, wherein the free radical initiator is selected from the group consisting of alkyl peroxides, hydroperoxides, peresters, and azo compounds.

4. The method of claim 1, wherein the solvent is present in an amount less that 50 wt % of the total amount of the monomers.

5. The method of claim 1, wherein the solvent is present in an amount less than 30 wt % of the total amount of the monomers.

6. The method of claim 1, wherein the solvent is present in an amount less than 10 wt % of the amount of the total amount of the monomers.

7. The method of claim 1, wherein the allylic alcohol has the general structure:

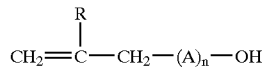

wherein R is selected from the group consisting of hydrogen, $C_1$–$C_{10}$ alkyls, and $C_6$–$C_{12}$ aryls; A is an oxyalkylene group; and n, which represents an average number of oxyalkylene groups, is from about 0 to about 5.

8. The method of claim 7, wherein n is from about 1 to about 2.

9. The method of claim 7, wherein n is about 1.

10. The method of claim 1, wherein the allylic alcohol is selected from the group consisting of allyl alcohol, methallyl alcohol, allyl alcohol propoxylates, and allyl alcohol ethoxylates.

11. The method of claim 1 wherein the allylic alcohol is allyl alcohol monopropoxylate.

12. The method of claim 1, wherein the alkyl acrylate or methacrylate is selected from $C_1$–$C_{20}$ alkyl acrylates and methacrylates.

13. The method of claim 1, wherein the alkyl acrylate or methacrylate is n-butyl acrylate.

14. The method of claim 1, wherein the APHA color increase is 50% or less.

15. The method of claim 1, wherein the resulting acrylic polyol has a number average molecular weight within the range of about 500 to about 10,000 and a polydispersity (the ratio of the weight average molecular weight over the number average molecular weight) within the range of about 1.5 to about 3.5.

* * * * *